Figure 17:
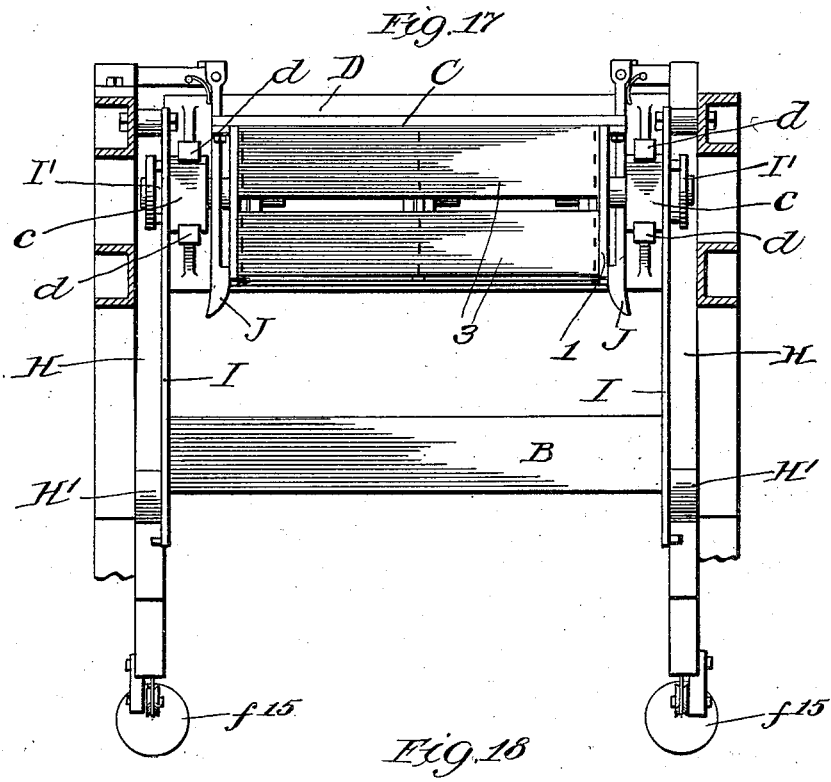

No. 692,882. Patented Feb. 11, 1902.
P. F. LINDT.
BOX STAPLING MACHINE.
(Application filed May 27, 1901.)
(No Model.) 10 Sheets—Sheet 1.
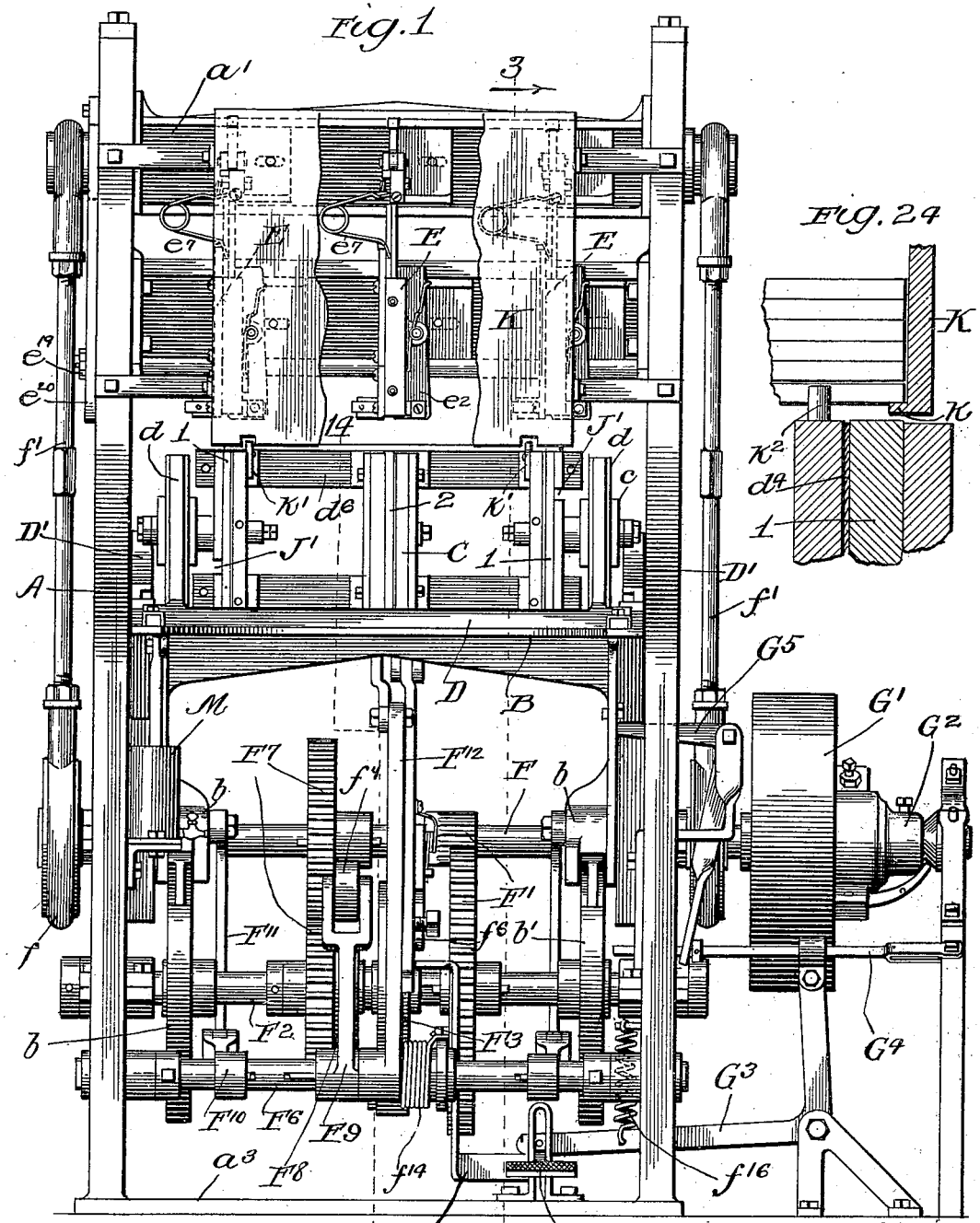

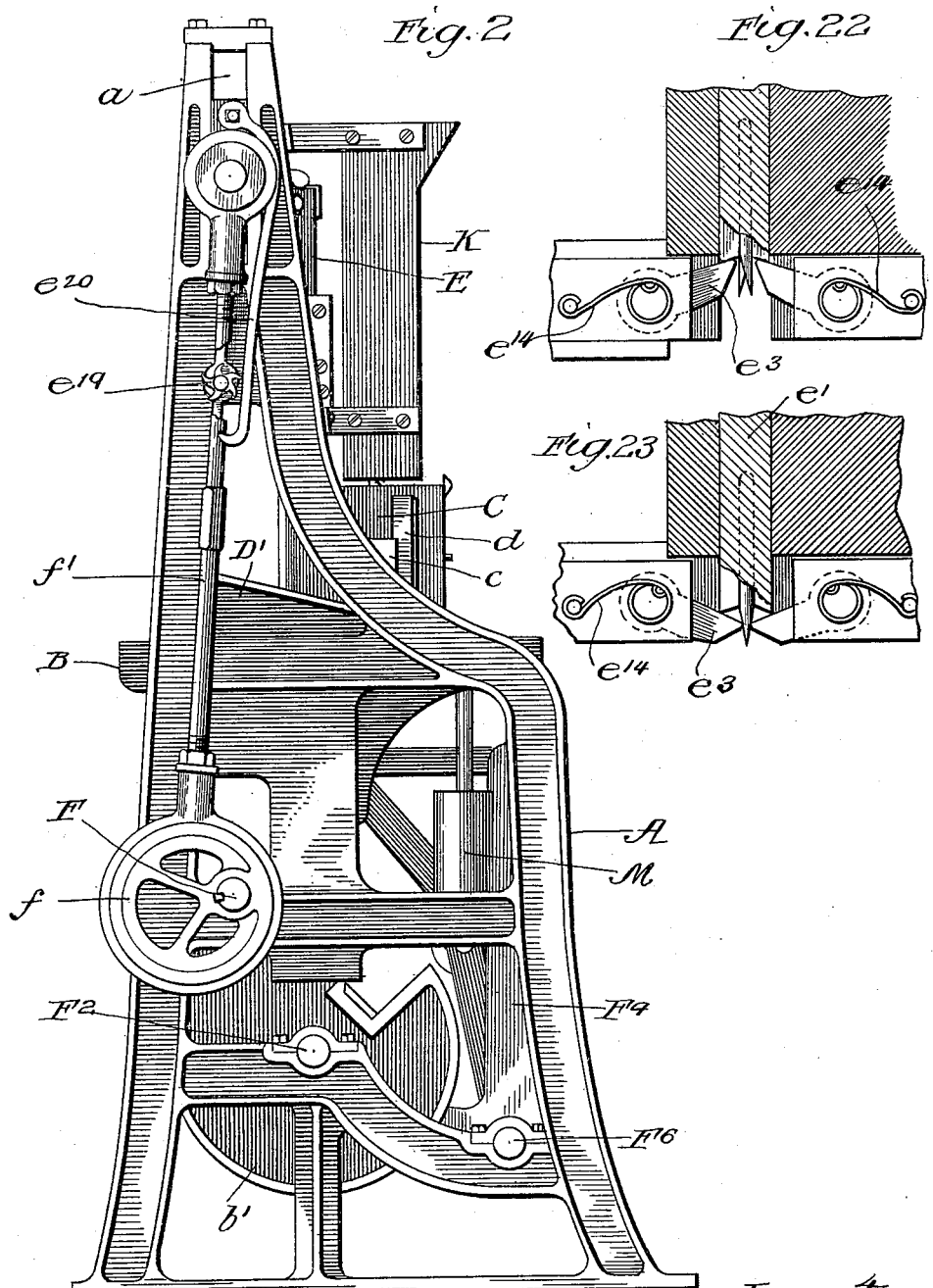

No. 692,882.
P. F. LINDT.
BOX STAPLING MACHINE.
(Application filed May 27, 1901.)
Patented Feb. 11, 1902.
(No Model.)
10 Sheets—Sheet 3.
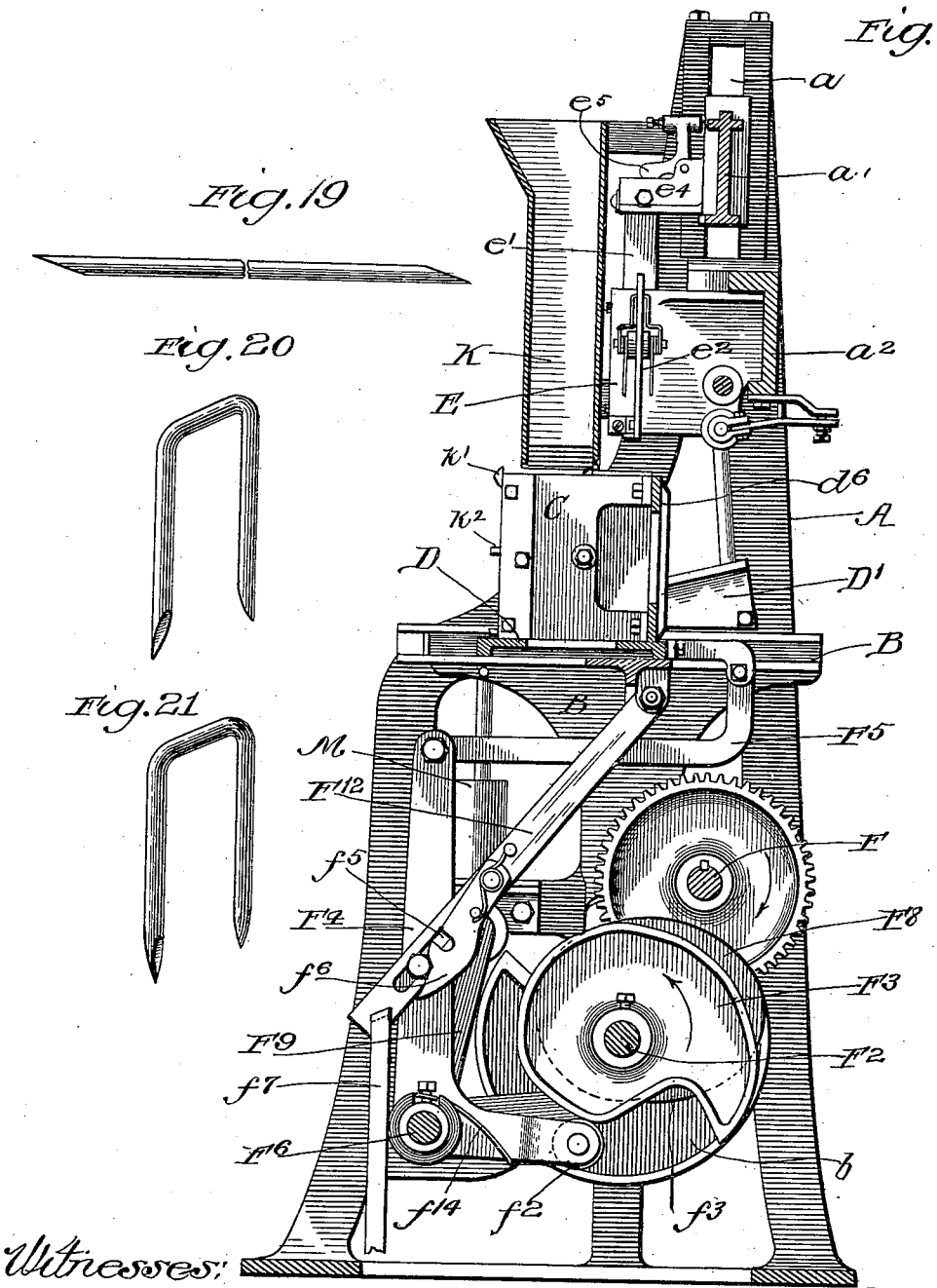

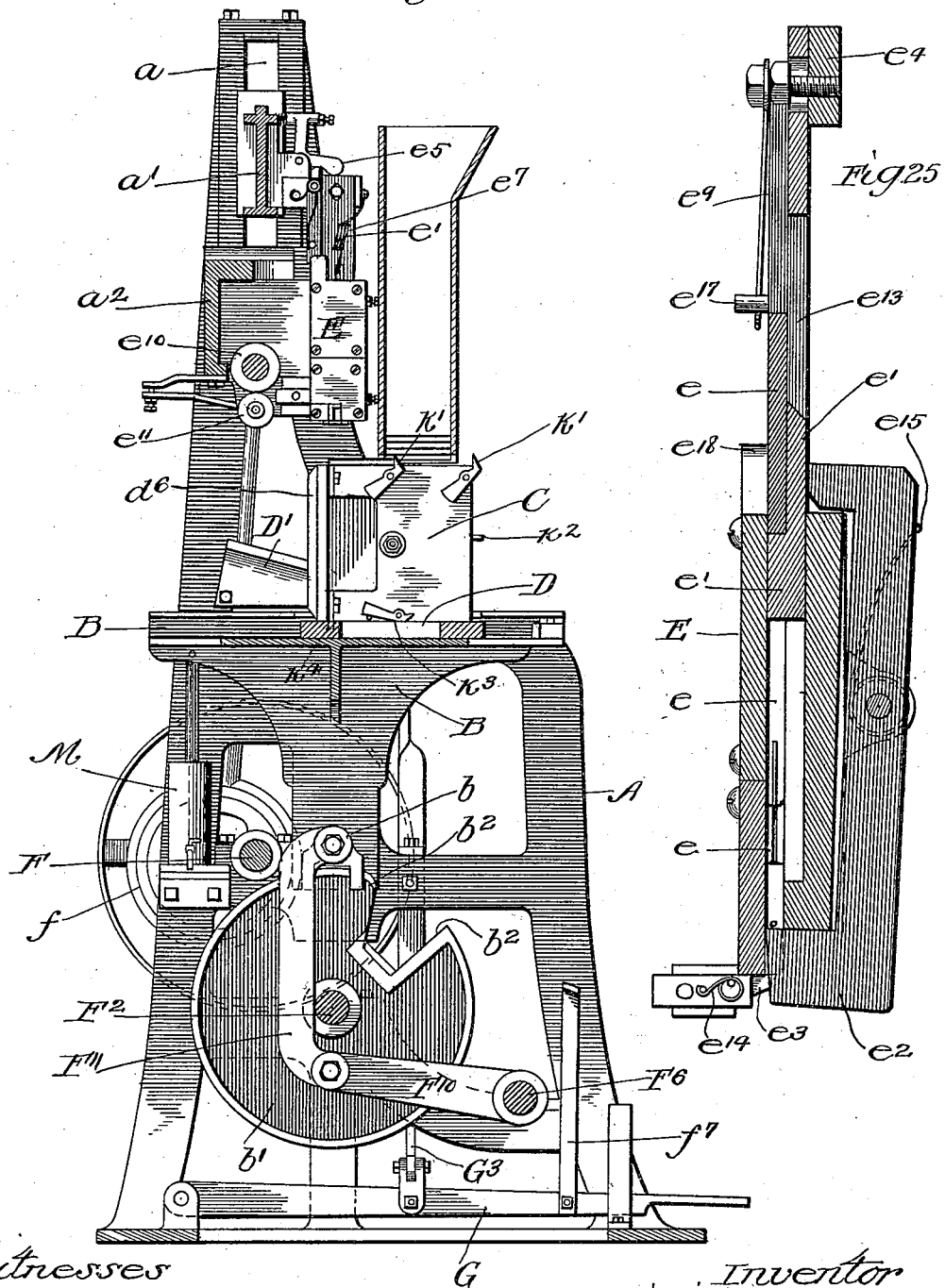

No. 692,882. Patented Feb. 11, 1902.
P. F. LINDT.
BOX STAPLING MACHINE.
(Application filed May 27, 1901.)
(No Model.) 10 Sheets—Sheet 5.
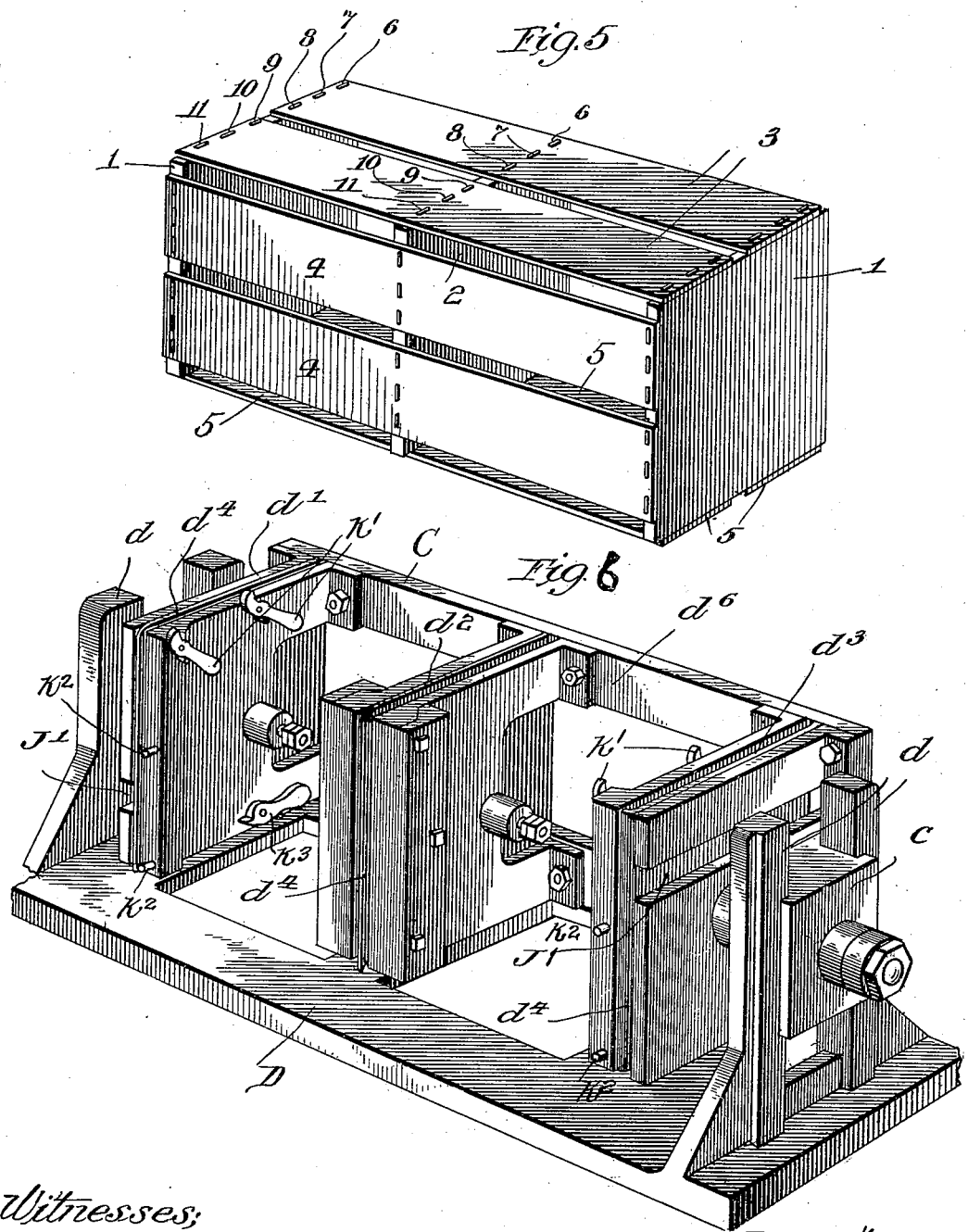

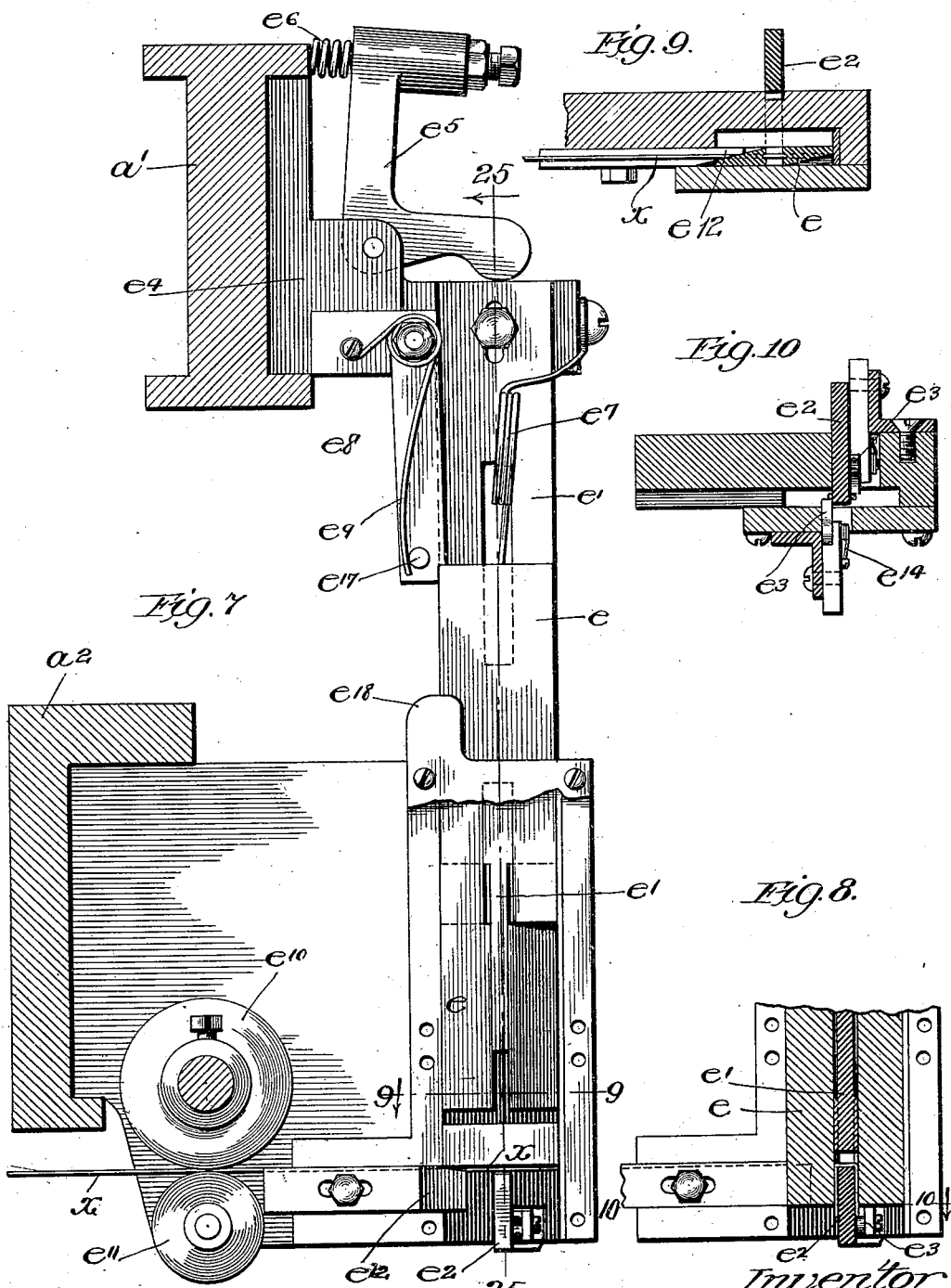

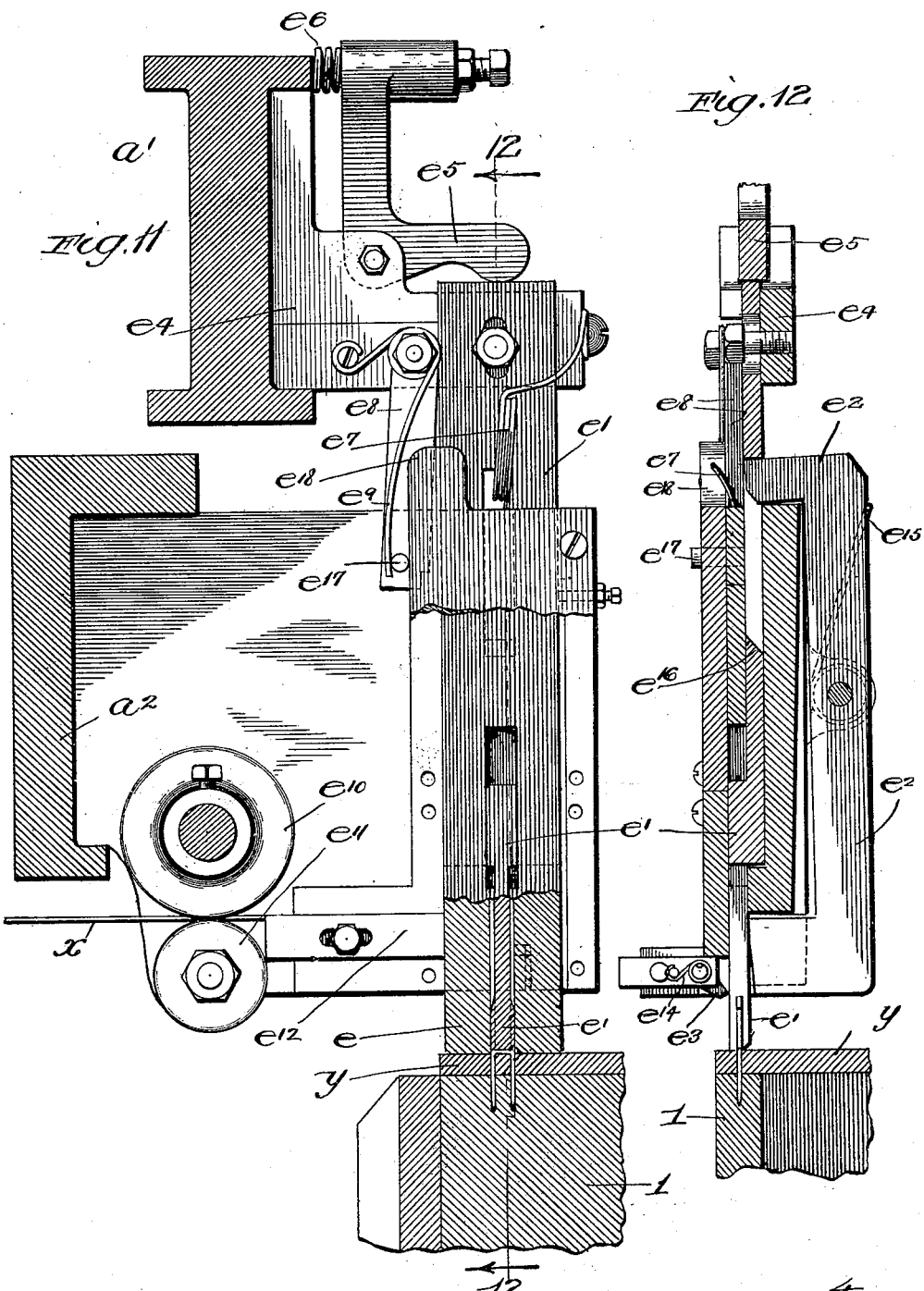

No. 692,882. Patented Feb. 11, 1902.
P. F. LINDT.
BOX STAPLING MACHINE.
(Application filed May 27, 1901.)
(No Model.) 10 Sheets—Sheet 8.
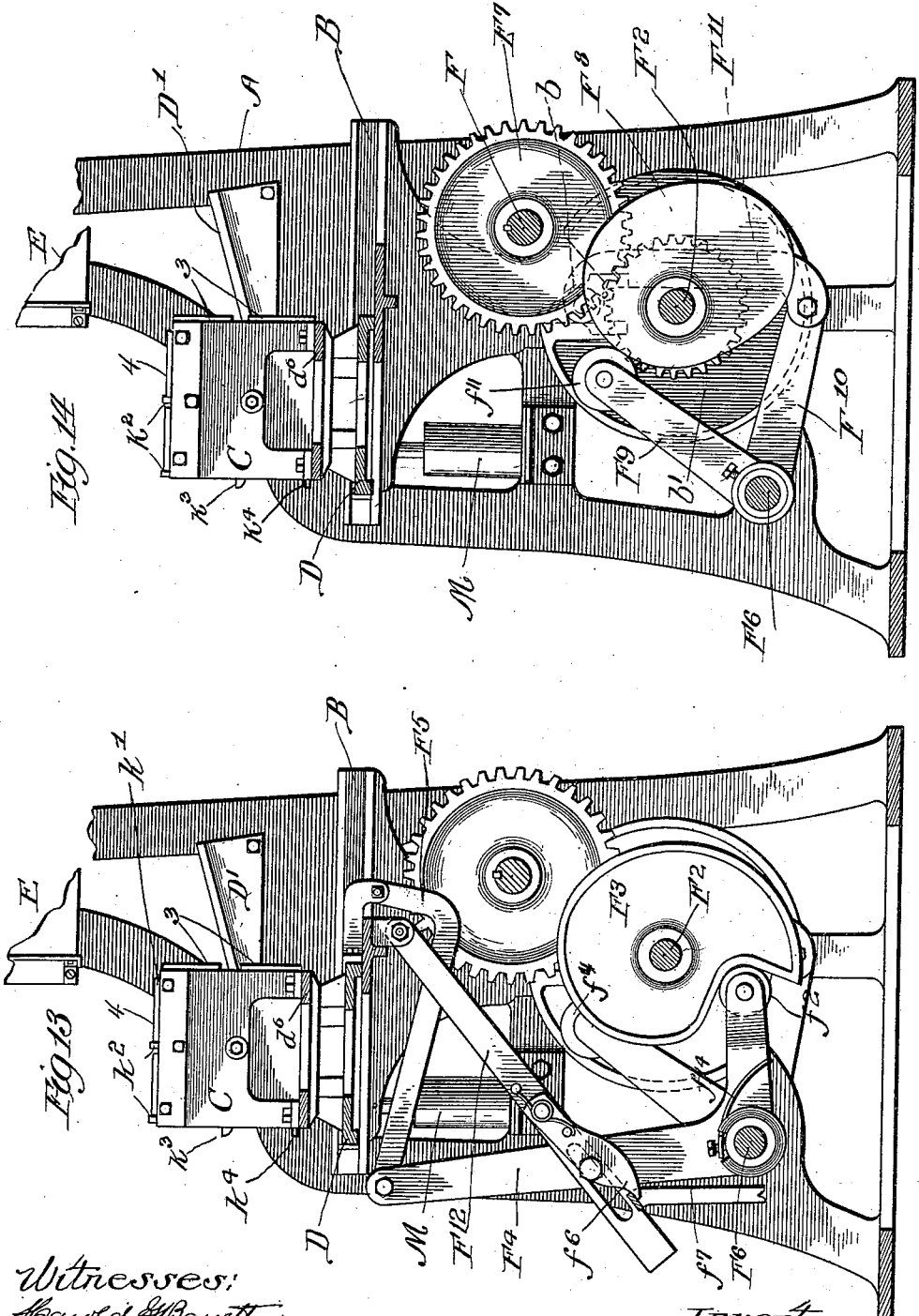

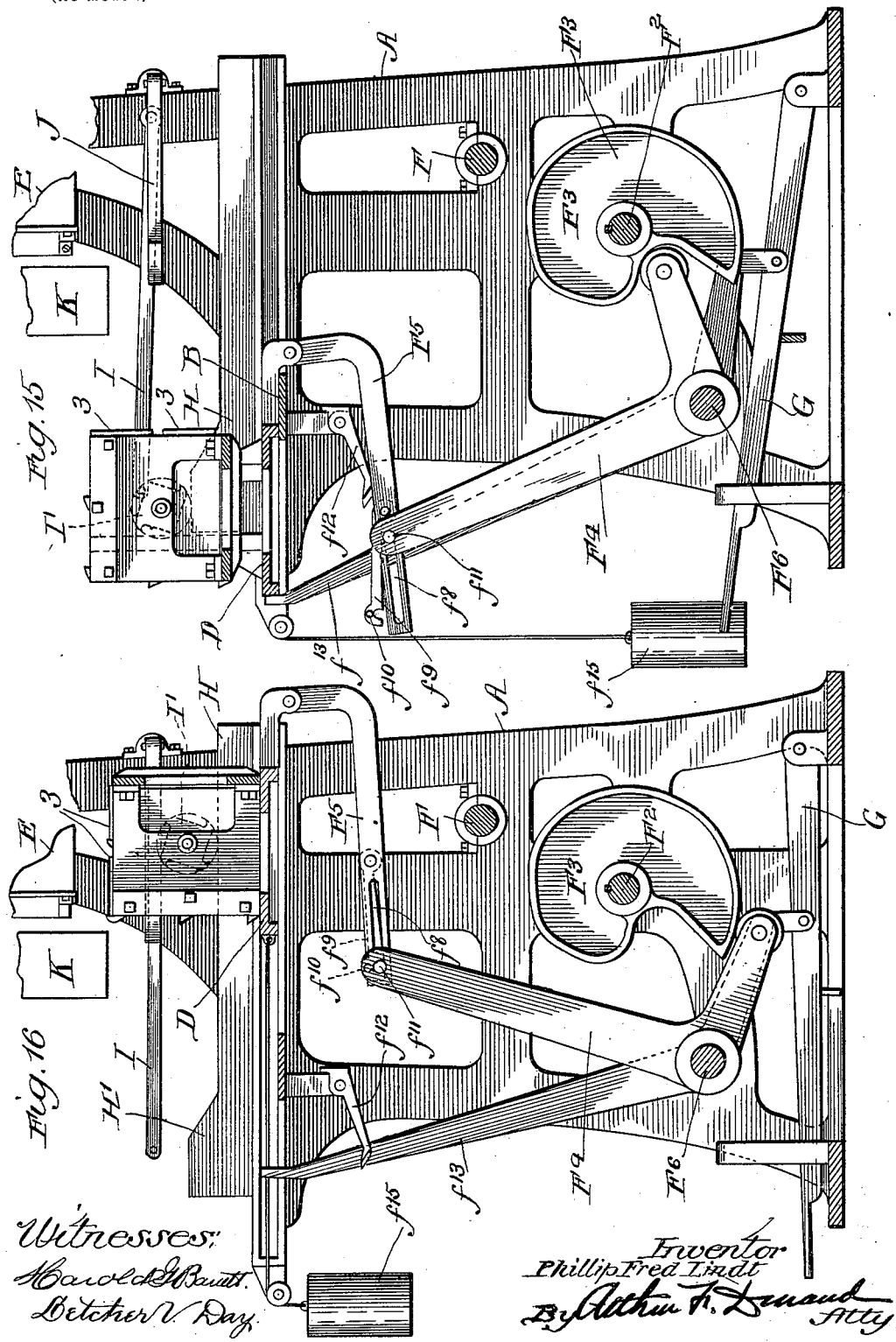

No. 692,882. Patented Feb. 11, 1902.
P. F. LINDT.
BOX STAPLING MACHINE.
(Application filed May 27, 1901.)

(No Model.) 10 Sheets—Sheet 10.

Witnesses:
H. G. Barrett
L. V. Day

Inventor
Phillip Fred Lindt
By Arthur F. Durand
Atty.

UNITED STATES PATENT OFFICE.

PHILLIP FRED LINDT, OF ST. JOSEPH, MICHIGAN.

BOX-STAPLING MACHINE.

SPECIFICATION forming part of Letters Patent No. 692,882, dated February 11, 1902.

Application filed May 27, 1901. Serial No. 62,074. (No model.)

*To all whom it may concern:*

Be it known that I, PHILLIP FRED LINDT, a citizen of the United States, residing at St. Joseph, in the county of Berrien and State of Michigan, have invented a certain new and useful Improvement in Stapling-Machines, of which the following is a specification.

This invention relates to stapling-machines in general, but more particularly to machines for stapling together the parts of a crate, box, or other like receptacle.

The objects of the invention are the provision of a simple, effective, and comparatively inexpensive machine for securing together the parts of a crate or similar article; to provide a machine capable of rapid and efficient work without mutilating the stock or material; to secure accuracy in driving the staples; to provide a machine capable of driving the staples into the edges of comparatively thin boards; to provide a machine capable of stapling together the various parts of a crate, box, or like article with as little handling or manipulation of the material as possible; to provide for the automatic removal of the finished work or product from the form; to provide suitable forming mechanism capable of producing staples with straight points; to provide simple and effective mechanism for bending the points of the staples; to reduce the cost of certain articles of manufacture—such, for example, as berry-crates, egg-crates, boxes, baskets, and other similar receptacles; to make it possible to provide crates, boxes, &c., which are not only cheaper, but which are also stronger and better adapted to withstand handling and rough usage, and to provide certain details of improvement tending to increase the general efficiency and to render a machine of this character serviceable and satisfactory in its operation.

To the foregoing and other useful ends the stapling mechanism can comprise means for cutting the wire into suitable lengths and for then bending such lengths into the proper shape. Preferably the cutting device is of such character that the said lengths are provided with one-sided points, and for this reason the staples when bent have one-sided points which are out of line with each other. Before the staples are driven into the wood these points are bent or deflected, so as to bring them into line and so as to provide each leg of the staple with a straight point. In this way the staples are bent or turned at their points in such manner as to permit them to be driven straight into the wood without being deflected to one side. Furthermore, by thus bending the points of the staples they are made to enter the wood in such manner as to be less liable to pull out, and thereby insure greater strength on the part of the crate or box.

The staple bending and driving devices are preferably arranged in a row or line, and the form for holding the work is preferably constructed with devices or means for holding the transverse boards or walls of the crate, the number of staple bending and driving devices corresponding to the number of transverse walls or boards of the crate or box and the form being arranged in position to hold each transverse board or wall in line with its allotted stapling device. Said form can be mounted for rotation about a horizontal axis, so as to enable it to turn and successively present the side and bottom edges of the boards to the stapling devices. The slats or side and bottom portions of the crate or box can be automatically deposited upon the form, and in this way it will only be necessary to first insert the boards or transverse walls of the crate in the form and to then start the machine, the slats or sides of the crate being automatically deposited upon the form and then stapled to the boards and the form then being automatically turned to enable it to present the succeeding edges of the boards. A support can be provided for the form, and the form and its support can be arranged to separate automatically, so as to allow the form to rotate and to then reëngage the under side of the form during the operation of driving the staples, so as to sustain the weight of the form and the pressure of the drivers. The axis of the form is preferably parallel with the row of stapling devices, and the bodily forward-and-back movement of the form is preferably in a direction at right angles to said axis, and the form while advancing below the staple bending and driving devices is preferably given an intermittent shift or feeding movement, so as to allow the staples to be driven into the wood. With this arrangement the form moves forward the required distance, stops to allow the requisite number of staples to be driven through the slat and into boards, and then moves on and repeats the operation until the required number of slats have been secured to said boards. The arrangement can be such that the machine will stop each time the form returns to its original or inoperative position. Preferably the form is automatically turned during its return to such position and at a point near the end of its back stroke.

In order to automatically remove the crate from the form, the latter can be provided at its ends with slots or grooves, and swinging arms or grappling-hooks can be arranged to enter these slots and engage the finished work or product, the arrangement being preferably such that these swinging arms or grappling-hooks will not perform their function until the crate or other article is finished. These arms or hooks can be arranged to hold the crate or box in such position that it will be ejected from the machine by the return of the form into position to start the construction of the next crate. In this way the manipulation of the stock and also of the finished work or product is reduced to a minimum. If desired, however, the removal of the crate from the form can be accomplished by hand. In some cases it may be preferable to remove the crate by hand, while in others it may be preferable to allow the machine to remove or eject the crate automatically. It will also be seen that, if desired, the form can be rotated by hand and that the means for automatically feeding the slats can likewise be dispensed with. In other words, the turning of the form, the removal of the crate or box, and also the feeding of the slats can be accomplished automatically or by hand, as may be best suited to circumstances.

Ordinarily crates, boxes, and like articles are constructed by nailing together the parts of which they are composed. Nailing is a comparatively expensive operation, and, furthermore, nailed crates are illy adapted to withstand handling and rough usage. When stapled, however, the parts of a crate are secured together so firmly as to make it permissable to subject the crate to more or less handling or rough usage without injurious effects. Furthermore, the stapled crate is not only stronger and, as explained, better adapted to withstand use and handling, but is also cheaper and less expensive to manufacture.

The principal object of this invention is, therefore, the production of a stronger, more durable, and better article at less cost than heretofore.

The character of the invention, together with other points and advantages, will hereinafter more fully appear.

Figure 18:
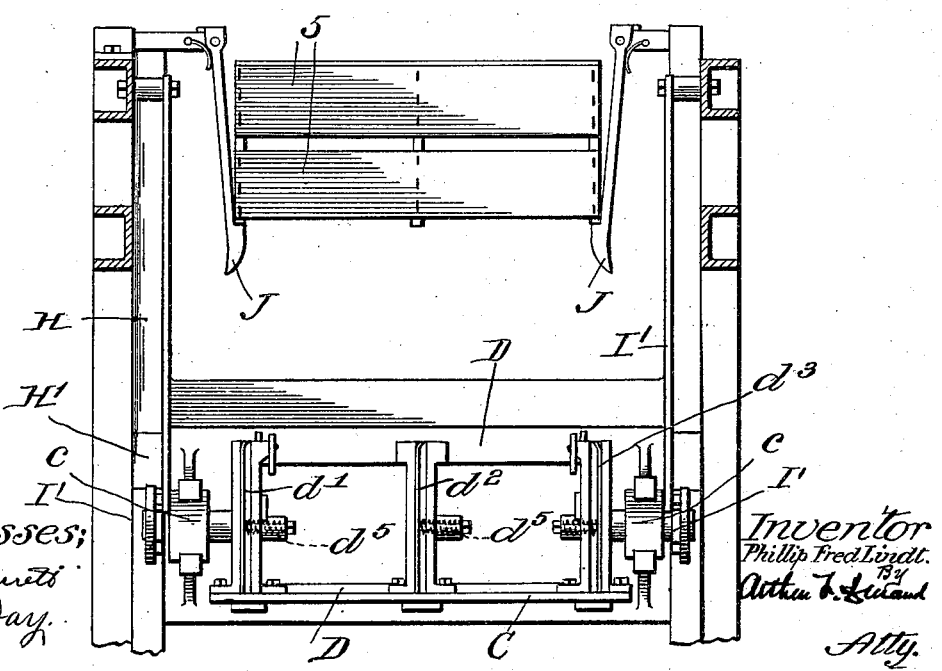

In the accompanying drawings, Figure 1 is a front elevation of a crate-stapling machine embodying the principles of the invention. Fig. 2 is a side elevation of the same. Fig. 3 is a vertical section on line 3 3 in Fig. 1. Fig. 4 is a vertical section on the same line in the same figure looking in the opposite direction. Fig. 5 is a perspective of an ordinary berry-crate. Fig. 6 is a perspective of the rotary form and its sliding or shifting support. Fig. 7 is an enlarged side elevation of one of the staple bending and driving devices, a portion of the face-plate being broken away to expose the former and driver. In this view the former and driver are in their elevated positions and the wire is shown in position across the loop-bar. Fig. 8 is a detail showing the lower end of the former and driver and adjacent parts, the view showing the way in which the staple is bent over the loop-bar by the downward movement of the former. Fig. 9 is a horizontal section on line 9 9 in Fig. 7. Fig. 10 is a horizontal section on line 10 10 in Fig. 8. Fig. 11 is a view similar to Fig. 7, but showing the former and driver down and a staple driven into the wood. Fig. 12 is a vertical section on line 12 12 in Fig. 11. Fig. 13 is a view similar to Fig. 3, but showing the form in its extreme rear or inoperative position and showing the upper part of the machine broken away. Fig. 14 is a view similar to Fig. 13—that is to say, the position of the parts being the same, but the section being taken on the line 14 14 in Fig. 1. Fig. 15 is a view similar to Fig. 13, but illustrating a somewhat different construction and a different arrangement for securing a separation of the form and its support. In this figure the form is shown in its extreme rear or inoperative position. Fig. 16 is a view similar to Fig. 15, the construction being the same, but the form in this case being shown in its extreme forward position. Fig. 17 is a plan of the construction and parts shown in Fig. 16. Fig. 18 is a view similar to Fig. 17, but showing the form in the position shown in Fig. 15 and illustrating the manner in which the arms or grappling-hooks automatically remove the crate from the form. Figs. 19, 20, and 21 illustrate the steps employed in bending and shaping the staples. Figs. 22 and 23 illustrate the manner in which the dogs or fingers engage and bend the points of the staples. Fig. 24 is a detail illustrating the manner in which the pins or projections on the form automatically remove the slats from the bottom of the hopper or holder. Fig. 25 is a section on line 25 25 in Fig. 7.

The machine thus illustrated is adapted for stapling together the parts of an ordinary berry-crate, such as the one shown in Fig. 5. A crate of this kind consists of the transverse or end boards 1 1, the intermediate board or partition 2, the slats or side pieces 3, the slats or bottom pieces 4, and the similar slats or side pieces 5. As illustrated in Fig. 5, each slat is secured to the transverse boards or walls by nine staples, there being three staples at each end and three in the middle. In making the crate the slats or side pieces 3 3 are the ones first secured to the crate-boards, the staples 6 being driven first. The crate is given an intermittent forward movement, and after the staples 6 have been driven the crate is then moved along and the staples 7, 8, 9, 10, and 11 follow in their order. In this way three staples are driven at a time, one at each end and one in the middle, and it requires three successive operations of the stapling devices to secure a slat to the crate-boards. The slats or bottom pieces 4 are next secured to the bottom edges of the crate-boards, the operation being identical with that just described and it being understood that after stapling on the sides 3 the form is then turned so as to bring the bottom edges of the crate-boards uppermost. The final operation consists in again turning the form so as to bring the remaining side edges uppermost and then stapling on the slats or side pieces 5 5. This, in brief, is the operation of making a crate with a machine constructed in accordance with the invention. It will be understood, however, that the invention is applicable to the making of crates, boxes, and baskets of various kinds and that the invention is not limited to the production of crates of the exact form shown and described.

The stapling-machine illustrated comprises an upright frame or body A, adapted to provide suitable bearings for the various shafts and operative parts. At the upper portion said frame or body is provided with guide-ways $a$, in which the horizontal bar $a'$ is arranged for vertical reciprocation. At a point immediately below said bar the two sides of the frame or body can be connected by a stationary bar $a^2$. The lower ends of the sides of the frame or body can be connected by suitable webs or bars $a^3$. In this way a rigid frame or body is provided, and ample space or room is provided for the shafts, gearing, and other operative parts. Arranged horizontally between the two side portions of the frame the vertically-reciprocating table B provides a suitable support for the form C. Said table can be arranged to slide in guideways on the frame or body. The said form is preferably mounted for rotation about a horizontal axis and is preferably carried by the horizontally sliding or shifting support D. This support can be arranged for forward-and-back movement in guideways on the said table, the arrangement being preferably such that the form will have a bodily forward-and-back movement as the result of its sliding or shifting connection with the table and also a bodily rise and fall as a result of the vertical reciprocation of said table. The rotary form is adapted to hold the work—that is to say, is adapted to hold the stock or material for making the crate—and is preferably mounted in bearings $c$, which are arranged to slide up and down in the guideways $d$. These guideways, it will be observed, rise from the opposite ends of the support D and permit the form to normally rest or bear upon the support D. The form is preferably provided with means for holding the boards or transverse walls of the crate in position to receive the slats or side pieces. The devices for holding the crate-boards can be of any suitable form or construction, but preferably consist of recesses $d'$, $d^2$, and $d^3$, arranged with respect to the position which these boards occupy in the crate. The said recesses can be provided with clamping-plates $d^4$, backed by springs $d^5$, (see Fig. 18,) and with this arrangement the three crate-boards can be inserted edgewise into the said recesses and when thus inserted will be firmly maintained in place by the pressure of the said plates and springs. In inserting these boards their top edges are inserted first, and when in place these top edges will rest against the connecting framework or false bottom $d^6$. This, it will be seen, leaves the side and bottom edges of the crate-boards exposed and in position to receive the slats or side pieces of the crate. When held by the form, the crate-boards rest upon the support D during the operation of driving the staples. In this way the support D sustains the weight of the form and the pressure of the drivers during the operation of securing the slats to the edges of the crate-boards.

The staple bending and driving devices may be of any suitable known or approved construction. As a matter, however, of further and special improvement the mechanism for bending and driving the staples is constructed as shown in Figs. 3, 4, 7, 8, 9, 10, 11, 12, 22, and 25. The stapling devices E thus constructed are carried by the bars $a'$ $a^2$. It will be observed that the number of said devices corresponds to the number of crate-boards. It will also be observed that when inserted in the form each crate-board is in line with its allotted staple bending and driving device. As illustrated, the crate is provided with three boards or transverse walls, and consequently the machine illustrated comprises three staple bending and driving devices each arranged in position to operate upon the side and bottom edges of one of said boards. As the three stapling devices shown are all similar in construction and operation a description of one will be sufficient. In each device, therefore, the mechanism for cutting, bending, and driving the staples comprises a former $e$, a driver $e'$, a loop-bar $e^2$, and the point-bending dogs or fingers $e^3$. The said driver is carried by the bar $a'$, preferably through the medium of a bracket $e^4$. In order to prevent mutilating the stock, the driver preferably has a yielding connection with said bracket, its upper end being backed by a bell-crank $e^5$. A coil-spring can be interposed between the said bell-crank and the bar $a'$, and with this arrangement the resistance offered by the staple and by the stock or material will be sustained by the spring $e^6$. If the stock is a little too thick, said spring will yield and prevent the driver from crushing the slat. The said former is preferably bifurcated and slidingly connected with the driver. In order to secure the desired relative movement on the part of the former and driver, the said former can have its upper end connected with the bracket $e^4$ by means of a spring $e^7$. The tension of this spring will keep the prongs or bifurcated lower end at all times below the driver, except when the driver descends for the purpose of driving in the staples, as shown in Figs. 11 and 12. In Figs. 7 and 25 the former and driver are in their normal relative positions, the prongs or bifurcated lower ends of the former extending slightly below the lower end of the driver. In this position the pivoted loop-bar $e^2$ occupies a position to coöperate with said former in bending the wire. When the bar $a'$ is at the upper end of its stroke and for a portion of its downward stroke, the former and driver are locked against relative movement by the swinging arm or latch $e^8$. This arm may be pivoted to the bracket $e^4$ and can be arranged in such manner that its lower end will engage the upper end of the former $e$, thereby locking the former and driver against relative movement. A spring $e^9$ can be employed for holding the said arm or latch in position to lock the former and driver against relative movement. The wire $x$ is fed across the loop-bar, as shown in Figs. 7 and 25, the feeding mechanism consisting, preferably, of a pair of rolls $e^{10} e^{11}$. When locked against relative movement, as shown in Fig. 7, the former and driver move downwardly together, the prongs or bifurcated lower ends of the former engaging the wire, cutting off a suitable length and bending the ends of said length downward, as shown in Fig. 8. The cutting device preferably consists of the knife $e^{12}$, secured to the casing of the staple bending and driving mechanism and arranged to coöperate with the lower end of the former in cutting off the wire. Referring to Fig. 9, it will be observed that the cutting device thus provided is of such character as to provide the staple with one-sided points. The cutting edges, it will be observed, do not extend at right angles to the wire, but are arranged to cut the wire on the "bias," so to speak, and in such manner that each length of wire when bent into the proper shape through the coöperation of the former and loop-bar will have a pair of one-sided points as a result of the manner in which the wire is cut. It will be seen (see Fig. 25) that the loop-bar is maintained in position to coöperate with the former by having its upper end in engagement with the back of the driver $e'$. When the driver and former descend together, and after the staple has been properly bent and shaped, the upper end of the loop-bar slips into the slot $e^{13}$ and allows the driver to descend and force the staple from between the prongs of the former and into the wood of the crate. As stated, the staple is primarily provided with one-sided points, and thus formed could not be satisfactorily driven into the wood. It will be seen, however, that before the staple is allowed to enter the wood its points are deflected or bent by the action of the dogs or fingers $e^3$. (See particularly Figs. 22 and 23.) These dogs or fingers are preferably arranged at opposite sides of the former and the driver and in position to be engaged by the lower end of the former. The downward movement of the former causes each dog to swing downward, and in so doing the end of each dog or finger comes in contact with the staple-points, and the outward movement of the dogs although slight is, it will be seen, sufficient to slightly bend or deflect the points of the staple. In this way each staple before being driven into the wood is provided with a pair of straight points, which enable it to enter the wood without burring and without danger of its points being deflected from their proper path. In other words, by thus bending the points of each staple the dogs or fingers insure accuracy in driving and enable the staples to enter the wood in a manner best calculated to firmly secure the slats to the crate-boards. Without the said dogs or fingers the staples would enter the wood in such manner as to be easily pulled out; but by straightening or centralizing the points of the staple this difficulty is obviated and absolute certainty and accuracy are insured in driving the staples. As illustrated, the said dogs or fingers are controlled by springs $e^{14}$. These springs serve to maintain the ends of the dogs in their normally elevated positions, but allow the dogs to yield to the downward pressure of the former, as shown in Fig. 23. When the former and driver rise after the driving of the staple, said springs return the dogs to the position shown in Figs. 22 and 25. The spring $e^{15}$ tends to normally maintain the loop-bar in the position shown in Fig. 12. In rising, however, the bevel $e^{16}$ at the lower end of slot $e^{13}$ in the driver engages the upper end of said loop-bar and returns the lower end of said bar to its operative position. (See Fig. 25.) In this way the operation of forming and driving the staple consists in feeding the wire $x$ across the knife $e^{12}$ and over the lower end of the loop-bar and then causing the former to descend, so as to cut off the wire and bend it over the loop-bar, and in then straightening the points of the staple, and in then releasing the former from the driver, so as to allow said driver to descend alone and force the staple into the wood. The arrangement is such that the former will descend until it rests upon the wood, and at this point the pin $e^{17}$ on the arm or latch $e^8$ strikes the bevel $e^{18}$ on the casing of the staple bending and driving mechanism. As soon as said pin strikes said bevel the former and driver become capable of relative movement, the latch or arm $e^8$ being thrown out of engagement with the upper end of the former, and the driver is then free to descend alone, the spring $e^7$ holding the former down upon the surface of the wood. It will be understood that the spring $e^7$ yields and permits relative movement between the bar $a'$ and the former.

The casing which incloses the staple bending and driving mechanism and which provides a guideway for the former and driver can be of any suitable construction and is preferably secured to the stationary bar $a^2$. In Figs. 7 and 11 the face-plate of said casing is broken away for the purpose of showing the formation of the driver and former. In Figs. 7 and 25 the former is in position to descend and cut off the wire and bend it over the lower end of the loop-bar. In Fig. 8 the former has descended and moved downwardly to an extent sufficient to cut off the wire and bend it into the proper shape over the loop-bar. Fig. 10 illustrates the arrangement of the dogs or fingers for straightening the staple-points, and in this view the parts are in the same position as in Fig. 8. In Figs. 11 and 12 the bar $e'$ is at the end of its downward stroke, and consequently the former is shown resting upon the wood or stock $y$, and the driver is shown resting upon the staple which has been forced by it through the slat and into the crate. The staple bending and driving mechanism thus constructed is simple and effective in its operation; but, as stated, other forms of construction may be employed, if desired. It is essential, however, that in any case some provision be made for straightening the points of the staple.

Any suitable arrangement can be adopted for reciprocating the bar $a'$. As illustrated, the ends of said bar are connected with the power-shaft F through the medium of eccentric cam $f$ and eccentric-rods $f'$. Said cams are adapted to give the said bar the desired extent of throw or up-and-down movement. As a simple arrangement for operating the feed-rolls $e^{10}$ and $e^{11}$ the shaft upon which the roll $e^{10}$ is mounted can be provided with a ratchet-wheel $e^{19}$ and the bar $a'$ can be provided with a pawl $e^{20}$, adapted and arranged to engage said wheel. With this arrangement the said feed-rolls will be actuated or rotated to feed the wire in the desired manner, the wire having an intermittent feeding movement as a result of the ratchet-wheel being engaged by the pawl each time the bar $a'$ moves upwardly. In other words, the upward movement of said bar operates through the medium of the ratchet device to feed the wire into the path of the former and driver. (See Figs. 7 and 9.)

As previously explained, the rotary form holds the work and is mounted for bodily shift or adjustment in such manner as to successively present the side and bottom edges of the crate-boards to the stapling devices. After inserting the crate-boards in the former the slats or side pieces for the first side of the crate are then laid across the form and the said form is then caused to advance into position to allow the stapling devices to drive the staples through the slats into the edges of said boards. As previously explained, with the construction of crate shown three staples are driven each time, one at each end and one in the middle. These staples, it will be observed, are preferably driven lengthwise into the edges of the crate-boards rather than crosswise. In other words, the staples are driven in such manner that their points are all in line, thereby making it possible to employ relatively thin crate-boards and comparatively wide staples. By the term "lengthwise" it is meant that the staples are longitudinally arranged and that when applied their heads or tops do not extend crosswise of the crate-board edges. It will be readily understood that it is desirable to have the form remain stationary during the driving of the staples. For this reason the form is constructed and arranged to have an intermittent forward shift or feeding movement, the form first advancing until the stock is in position to receive the first staples. At this point the form remains stationary long enough to enable the drivers to insert the staples, and when this has been done the form then moves forward to an extent sufficient to bring the stock into position to receive the next set of staples. At this point it again remains stationary long enough to permit the insertion of the staples and then again moves forward. This intermittent forward shift or feeding movement on the part of the form is continued until the two slats for the first side of the form are secured to the crate-boards, after which the form is caused to move back or return to its original or inoperative position. When returned to its normal or inoperative position, the form can be rotated for a quarter of a turn, so as to bring the bottom edges of the crate-boards uppermost, and the form can be then advanced and the bottom slats can then be secured to the bottom edges of the crate-boards in the same manner in which the side slats were secured to the crate-boards. When the bottom slats have been properly stapled and secured to the crate-boards, the form is then caused to move back or return to its original or inoperative position and is then again turned or rotated for a quarter of a turn, so as to bring the remaining side edges of the crate-boards uppermost. In this position the slats for the last side of the crate are applied and the form then caused to move forward, the operation of securing these side slats being identical with the operation previously explained.

In order to allow the form to rotate, it will be seen that it is necessary for the form and its support to separate. In other words, it is desirable that provision be made for causing sufficient relative movement on the part of the form and its support to permit the form to turn and present another side of the work to the stapling devices. This separation of the form and its support and also the forward and back movement of the form can be accomplished in any suitable manner. As a matter of further and special improvement, however, the forward and back movement of the form and its support is accomplished from the power-shaft F through the medium of gearing F', the shaft F², the cam F³, the bell-crank lever F⁴, and the link F⁵. The said bell-crank lever can be mounted on the shaft F⁶, and its short arm can be provided with a roll $f^2$, adapted to engage the periphery of said cam. The long or upper arm of said bell-crank is connected with the support D through the medium of the said link F⁵. Said cam rotates in the direction indicated by the arrows, and its periphery is so formed that its rotation will cause the form and its support to move forward, such forward movement being, as previously explained, a forward intermittent shift or feeding movement. The cam is so formed that when the form and its support D reach the limit of their forward movement they are released and allowed to have a quick return movement to their original or inoperative position. As shown in Fig. 3, the form is in a position to receive the first set of staples, and, as previously explained, during the driving of these staples the cam F³ permits the form to remain stationary. The shape of the cam, however, is such that as soon as said staples are driven the form and its support are caused to move forward to an extent sufficient to bring the stock in position for the second set of staples. This intermittent forward movement of the form and its support is, as previously explained, repeated or continued until all the staples necessary for one side of the crate have been driven. When this has been accomplished, the notch or depression F³ in said cam allows the form and its support to have a relatively quick return movement to the front of the machine. As previously explained, the form and its support must separate in order to allow the form to rotate, and for this reason the table B is, as previously explained, arranged for vertical reciprocation. Preferably the reciprocating movement of said table is accomplished from the power-shaft F through the medium of the gearing F⁷, the cam F⁸, the arm F⁹, the shaft F⁶, the arm F¹⁰, and links F¹¹. (See Figs. 3, 13, and 14 and also Fig. 1.) The cam F⁸ is secured to the pinion which meshes with the gear on the shaft F and, being loose upon the shaft F², will, as a result of the employment of speed-up gearing, revolve much faster than cam F³. The end of the arm F⁹ can be provided with a roll $f^4$, arranged to engage the periphery of said cam. Both the arms F⁹ and F¹⁰ are keyed to the shaft F⁶ and provide a sort of bell-crank arrangement for enabling the cam F⁸ to raise and lower the table B. The formation of said cam F⁸ is such that the table will descend as soon as the last set of staples for one side of the crate has been driven. When the table descends, the hubs or bearings of the form rest upon the ways D'. Said ways incline toward the front of the machine and allow the form to slide back to the front of the machine. The downward movement of the table, however, is sufficient to bring the support D some distance away from the under side of said form. It will be seen, therefore, that while both the form and its support descend the relative movements are such that the form and its support separate, and thereby permit the form to turn or rotate. Continuing its movement, the cam F⁸ then causes the table to rise until the support D engages the under side of the form and until both the support and form are carried upwardly into position to receive the next pair of slats and be again advanced intermittently below the stapling devices. It will be observed that the side portions of the table are provided with rolls or cylindric projections $b$ and that the disks $b'$ are mounted upon the shaft F² in position to engage said rolls or cylindric projections. Each disk is provided with a notch $b^2$, and these notches engage said rolls or projections at the same time that the notch $f$ in the cam F³ engages the roll $f^2$. With this arrangement the said disks and the cam F³ coöperate to allow the table to fall. The purpose, however, of these disks is to support the table during the operation of stapling the slats to the crate-boards. For this reason the said disks are of such diameter as to cause the table B to rise sufficiently to carry the roll $f^4$ away from the cam F⁸, it being understood that the cam F⁸ rotates much faster than the disk. In this way the cam F⁸ serves to give the table a quick rise, and the disks $b'$ then take up the movement and hold the table at the required level during the intermittent movement of the form and its support. Each disk is provided, preferably, with a slight bevel $b^2$ to enable it to properly engage the rolls $b$, and thereby give the table a slight additional upward movement, which carries the roller $f^4$ beyond the reach of the cam F⁸. In order to prevent the form from returning too quickly to its inoperative position, the table can be connected with the bell-crank lever F⁴ by means of a link or locking device F¹². The bell-crank lever F⁴ can be provided with a bolt or pin sliding in slot $f^5$. This slot permits the requisite relative movement during the upward movement of the form and the upward movement of the table. When the table falls and the form and its support start to slide back, such backward movement of the form and its support is retarded by reason of the dog $f^6$ engaging the said bolt or pin of the bell-crank F⁴. With the said dog engaging the said pin or bolt the backward movement of the form will be dependent upon the downward movement of the table B. With the form and its support occupying the position shown in Fig. 13 the dog will engage the bolt or pin, and it will be necessary to disengage the dog or unlock the device before starting the mechanism for raising the table. This can be accomplished by providing a trip $f^7$, which engages said dog when the form is back and the table down and which will throw the dog out of engagement when the foot-treadle G is depressed for the purpose of starting the rotation of the cams. The table in rising will draw the link or bar $F^{12}$ upwardly until the bolt or pin upon the bell-crank $F^4$ will occupy a position near the lower end of the slot $f^5$. The table then, as explained, occupies its elevated position while the form and its support D move forward, such movement resulting in again bringing the bolt or pin on the bell-crank into engagement with the notch $f^5$ in the dog $f^6$. In this way the link or bar $F^{12}$ and its dog $f^6$, in connection with the pin or bolt on the bell-crank, constitute a locking device for practically locking the form to the table and for properly retarding the back movement of the form with its support. When the bell-crank is locked to the link or swinging bar $F^{12}$, the form and its support can again only move back as fast as the table descends. It is obvious, however, that various devices may be employed for retarding the return of the form and its support. It is also obvious that there are various ways for securing a separation of the form and its support. For example, in Figs. 15, 16, 17, and 18 the table providing the guideway for the support D is secured to the frame or body of the machine. The hubs or trunnions of the form are arranged to travel on rails or ways H. These rails or ways can be provided with raised portions or inclines H', which will operate to raise the form from its support when the two members are allowed to return to the front of the machine. In Fig. 16 the form and its support are shown at the limit of their forward stroke or movement, in which case the support D engages the under side of the form for the purpose of sustaining the weight of the form and the pressure of the drivers. In Fig. 15 the form and its support are shown at the limit of the return or back stroke, and in this case it will be seen that the elevated portions H' of the rails hold the form in a sufficiently-elevated position to allow it to be turned or rotated. With this arrangement the cam for operating the bell-crank lever $F^4$ can be of substantially the same shape and form as the one shown in the preceding construction. In this case, however, it is desirable that the form be allowed to travel farther back than in the construction shown in Fig. 3, and for this reason the link $F^5$ is in this case provided with a slot $f^8$ and with a dog or detent $f^9$. In order to secure the desired action, the said dog or detent can be provided with a pin $f^{10}$. The pin $f^{11}$ at the upper end of said bell-crank is arranged to travel in said slot and during the operation of bending and driving the staples is in engagement with the notch in said dog or detent. A trip or swinging arm $f^{12}$ can be supported from the under side of the table B and in position to engage the said pin $f^{10}$. With the form and its support in the position shown in Fig. 15 the pin $f^{11}$ is out of engagement with the said dog or detent, and for this reason it is desirable to provide means whereby the form and its support can be caused to travel a short distance without moving the bell-crank lever $F^4$. This can be accomplished by mounting a second bell-crank lever $f^{13}$ upon the shaft $F^6$. This bell-crank lever can be suitably connected with the said foot-treadle G, and its upper end is preferably adapted and arranged to engage the form-support D. With this arrangement the initial downward movement of said treadle in starting the machine will cause the form and its support to travel forward until the dog or detent $f^9$ engages the pin $f^{11}$, thereby locking the said pin at the rear end of the slot $f^8$. (See Fig. 16.) At this point the cam $F^3$ starts to rotate, and thereby continues the forward movement of the form and its support. It will be seen, therefore, that in the arrangement shown in Figs. 15 and 16 the primary or initial movement of the form is accomplished through the medium of the foot-treadle and that such movement is then continued by a cam, which causes the form to have an intermittent forward movement in the manner and for the purpose previously described. In the construction shown in Figs. 1, 2, 3, 13, and 14 a spring $f^{14}$ is employed for returning the form and its support to the front of the machine. In the construction shown in Figs. 15 and 16, however, the return movement of the form and its support is due to the action of the weights $f^{15}$. The size of these weights and the character of the incline H' can be regulated for the purpose of securing the desired retardation of the form in returning to its inoperative position. For example, the weights can be of such size as to draw the form and support back and cause the trunnions of the form to ride up the incline without jolt or jar. Preferably the weights are only large enough to enable the form to reach the top of the incline. The said inclines with which the rails or ways are provided are, it will be seen, practically cams for causing a deviation in the movement of the form. Such being the case, it will be seen that in both this construction and the one previously described a cam device is employed for securing a separation of the form and its support. In the construction illustrated by Figs. 13 and 14 the separation of the form and its support is accomplished by means of a cam $F^8$. In the construction shown in Figs. 15 and 16 such relative movement on the part of the form and support is secured by employing cams H'. Therefore, as stated in both constructions, the separation of the form and its support is due to the action of a cam.

Any suitable known or approved device or arrangement can be employed for starting and stopping the machine and for controlling the various movements. For example, the power-shaft F can be provided with a belt or pulley wheel G'. The transmission of power from this wheel to the shaft can be controlled by a suitable clutch $G^2$. As illustrated, this clutch is operated by the foot lever or treadle G through the medium of bell-crank lever $G^3$ and the rod $G^4$. It is also desirable to make some provision for automatically stopping the machine each time the form returns to its inoperative position. As a simple and effective arrangement for securing this mode of operation the said rod $G^4$ can be connected to the table B through the medium of a trip or bell-crank lever $G^5$. With this arrangement it will be seen that the lowering of the table will be accompanied by more or less movement on the part of said trip $G^5$ and rod $G^4$ and that such movement will operate to open the clutch, and thereby instantly stop the rotation of the shaft F. It is obvious, however, that various forms of clutch and trip mechanism may be employed for this purpose. In the drawings a spring $f^{16}$ is shown as a means for holding the clutch normally open. In Figs. 1, 3, 4, and 16 the foot lever or treadle is down, the clutch, therefore, being closed and the machine in operation. In Fig. 15, however, the treadle is up, the clutch open, and the machine at rest.

The turning of the form can be accomplished either by hand or automatically. As a simple and effective arrangement for automatically turning the form the pawls or dogs I can be arranged to engage the ratchet-wheels I' on the hubs or trunnions of the form. With this arrangement the back or return movement of the form and its support will be accompanied by a partial turn or quarter-rotation of the form as a result of the pawl engaging the ratchet. When the form moves forward, the pawls will slide over the teeth of the ratchet-wheels and remain in the position shown in Fig. 16 until the form again starts back and returns to its inoperative position. In this way the form can be automatically turned or rotated at the end of each back stroke. Various other devices can be employed for this purpose, if desired.

The removal of the product or finished work from the form may also be accomplished either automatically or by hand. The swinging arms or grappling-hooks J (shown in Figs. 15, 16, 17, and 18) constitute a simple and effective arrangement for automatically removing the crate from the form. These hooks are arranged in position to engage the ends of the form and at the proper time to enter the slots J' in the ends of said form. It will be observed that these slots expose the boards or ends of the crate. The ends of said swinging arms or grappling-hooks are of such character as to not interfere with the forward and back movements of the form and as to not attempt a removal of the crate until the proper time. It will be seen that the form first moves forward in order to allow the first pair of slats to be secured to the crate-boards. The form then moves back, is rotated, and then moves forward in order to allow the bottom slats to be stapled to the crate-boards. After this the form again returns to its inoperative position and then moves forward for the last time for the purpose of permitting the last pair of slats to be secured to the side edges of the crate-boards. When the form moves forward for the last time, the ends of the said arms or grappling-hooks enter the said slots and slip back of the top edges of the crate-boards. (See Fig. 17.) The form then moves back, leaving the crate between the two arms, as shown in Fig. 18. New stock can now be supplied to the form. By then causing it to move forward the finished crate will be forced forward from between said arms, and thereby ejected from the machine. In this way it will be seen that the said arms or grappling-hooks not only automatically remove the crate from the form, but also provide for the automatic ejectment of the crate from the back of the machine. It is apparent, however, that other suitable devices can be employed for securing this automatic removal of the crate without departing from the spirit of the invention.

There are numerous ways in which the slats can be supplied to the form and deposited in position to be operated upon by the stapling devices. For example, the operator may supply these slats to the form by hand and adjust them in place while the form is at rest. Still another way would be to provide a holder or hopper for automatically depositing the slats upon the upper side of the form. For example, in Figs. 1, 2, 3, and 24 a suitable hopper is shown attached to the machine and arranged in position to automatically feed the slats in the desired manner. As illustrated, the said hopper or holder K is of a shape or form to hold a desired number of the slats in a superimposed condition and is arranged immediately in front of the staple bending and driving devices. Each end of said hopper or holder can be provided with a lip $k$, (see Fig. 24,) upon which the ends of the lowermost slat are supported. The balance of the slats in the hopper will of course rest upon the slat which rests upon said lips. With this arrangement the form can be provided with means for removing two slats from the bottom of the hopper each time the form and its support move forward—for example, the end walls of said form can be provided with pivoted dogs $k'$ and $k^2$ and a pivoted dog and pin or lip $k^3$ and $k^4$. The small projections thus provided will remove a pair of slats from the bottom of the hopper each time the form moves forward. The first projections will strike the lowermost slat, remove the latter, and carry it forward on the form, and the succeeding projections will then remove the next slat and carry it forward with the form, each forward movement of the form in this way automatically removing two slats and depositing them in place upon the edges of the crate-boards. It will be observed that the devices thus applied to the form for assisting in automatically feeding the slats will not interfere with the removal of the crate in the manner illustrated in connection with Figs. 17 and 18. Fig. 24 is a detail sectional view showing a portion of the end wall of the hopper or holder and also a portion of the end crate-board 1. In this figure the adjacent portions of the form are also shown, and one of the pins $k^2$ is shown in position to engage the edge of the lowermost slat. It will be readily understood that this arrangement for automatically feeding the slats can be varied or modified in various ways without departing from the spirit of the invention.

In operation the form is brought to its inoperative position, as shown in Figs. 13 and 15. In this position the machine is at rest and the form is in position to permit the attendant to insert the crate-boards. When the crate-boards have been properly inserted, the attendant depresses the foot lever or treadle G, thereby starting the machine in the manner previously described. The rotation of the various operative parts, as already explained, causes the form to move forward, the support D first engaging the bottom of the form, so as to prevent the latter from rotating and so as to provide a firm base or support for the crate-boards. The form then moves forward, removes a couple of the slats from the hopper or holder, and then continues such movement to an extent sufficient to bring the stock into position to receive the first set of staples. The first set of staples in this case, three in number, is then driven through the first slat and into the side edges of the crate. The cam previously described then causes the form to move forward the required distance, and a second set of staples is then driven and the operation then continued in this way until both slats have been secured to the side edges of the crate. At this point, the cam releases the form from its support and allows the form to return to its original or inoperative position. At the end of its back stroke the form is automatically turned by the pawls or dogs I in the manner already described, and the form is then ready to again move forward for the purpose of permitting the second pair of slats to be secured to the bottom edges of the crate-boards. When these bottom slats have been secured to the crate, the form then again returns to its original position and is then turned for the purpose of bringing the remaining side edges of the crate-boards uppermost. The form is now ready to move forward for the last time for the purpose of enabling the stapling devices to secure the last pair of slats to the unfinished side of the crate. The arms or grappling-hooks J now engage or embrace the crate, as previously explained and as shown in Fig. 17, and the form then moving back releases itself from the finished crate and returns to the front of the machine preparatory to being again supplied with crate-boards for the next crate. The next forward movement on the part of the form and its support will, as previously described, force the finished crate forward and eject it from the machine.

In the construction shown in Figs. 1, 2, and 3 the dash-pot M can be employed for retarding the downward movement of the table B. In this way the drop or downward shift of the table will not be accompanied by jolt or jar. As previously explained, by straightening the points the staples are rendered capable of being driven into comparatively thin stock without danger of the points of the staples being deflected through the sides of the board. The stapling mechanism is therefore capable of operating upon comparatively thin crate-boards and of securing the slats to the edges of such boards in an efficient and highly-satisfactory manner. The process of making the staples is illustrated in Figs. 19, 20, and 21. Fig. 19 shows the straight length of wire provided with one-sided points. Fig. 20 shows the said length of wire bent into proper form, it being observed that the points are still one-sided in character. Fig. 21 illustrates the last step in the process and shows the completed staple provided with straightened or centralized points. With respect to the construction shown in Figs. 15 and 16 it will be seen that the small projections which are provided for automatically removing the slats from the hopper can in this case be provided with beveled or slanting backs, so as to permit the form to return to its at-rest position without catching or interfering with the bottom of the hopper. With this provision the points or projections on the form will when the form moves back simply slide under and slightly raise the stock in the hopper. It will be understood, however, that such beveling of the projections shown in Figs. 1, 2, and 3 will not be necessary, as in this case the form has a bodily-downward movement, as well as a horizontal shift, in returning to its at-rest position. In the construction first described the pivoted dogs are desirable, as they automatically disengage themselves from the edges of slats when the form is in position to have the finished crate removed. The pivoted dogs, it will be observed, are weighted at their inner ends, and when the form has been turned for the last time these weighted ends drop down and disengage the hook-shaped ends of the dogs from the crate-slats, thereby permitting the crate to be removed from the form. The pins or fingers at the side of the form upon which the bottom of the crate is made can, however, as explained, be simply pins driven or secured rigidly to the form. This is for the reason that these rigid pins or fingers are not located in such positions that they will in any way interfere with the removal of the crate or form. It is obvious, however, that these dogs or fingers for engaging the stock in the holder can be of any suitable form of construction and, moreover, that they can be located upon any suitable part of the moving structure composed of the rotatable form and sliding support. It will also be understood that the size or length of such projections can be regulated according to the thickness of the slats. The projections on the first side of the form—that is to say, the projections which remove the first pair of slats—can be somewhat longer than the projections for the bottom and opposite side of the form in view of the fact that the form is a little lower the first time it advances than it is when it advances for the last time. When the form advances for the first time, it will rest upon the upper surface of the support D; but when it advances for the last time its axis will have become somewhat elevated owing to the fact that the slats which were first secured to the crate-boards are now interposed between the under side of said form and the upper surface of said support. For this reason, as stated, the projections for the first side of the form can be somewhat longer than those of the succeeding sides.

It is obvious that the various features of the stapling-machine herein described may, if desired, be varied and modified without departing from the spirit of the invention.

What I claim as my invention is—

1. In a machine for making crates or boxes, the combination of a rotatable form, bodily-shifting support upon which said form is mounted, said form and support being adapted to separate, so as to permit the form to rotate, mechanical devices or means for positively moving said support forward and back in both directions, and staple shaping and driving mechanism for securing the slats or side pieces of said crate or box to the crate-boards or end walls.

2. In a crate or box making machine, the combination of means for inserting fastening devices, a rotatable form for holding the work, a sliding support upon which said form is mounted, the support and form being adapted to separate to permit the form to rotate, a driving-shaft adapted to be rotated by power, and power-transmitting connections whereby the former is moved back and forth by the power communicated to the shaft.

3. A machine for making crates, comprising a rotary form adapted to hold the boards or transverse walls of the crates, a support having a shifting connection with said form, the said transverse walls or boards of the crate resting edgewise upon said support, and suitable devices for securing the slats to the edges of said crate-boards, said form and support separating automatically for the purpose of permitting the form to turn or rotate, substantially as described.

4. A machine for making crates, comprising a shifting support upon which the crate-boards are supported or allowed to rest edgewise, a form for holding said crate-boards in position to receive the slats or side and bottom portions of the crate, suitable devices for fastenings for securing said slats to the edges of said crate-boards, and mechanism for causing relative shift on the part of the said form and support, and also relatively to the means which insert the fastenings into the slats and crate-boards, such relative shift being for the purpose of permitting the form to turn or rotate and thereby successively present its sides to the means or devices for applying the fastenings to the slats and edges of the crate-boards, substantially as described.

5. A machine for making crates, comprising a form for holding the crate-boards in their proper relative positions, means for driving or applying fastenings to the slats and edges of crate-boards, so as to secure said slats to the edges of said crate-boards, and mechanism for automatically shifting said form relatively to said means for applying fastenings, and also for automatically rotating the form, so as to automatically present the different sides of the form to the means or mechanism for applying the fastenings, the said form having an automatic and intermittent bodily shift relatively to the means which apply the fastenings, substantially as and for the purpose set forth.

6. A machine for making crates, comprising a rotatable form adapted to hold the crate-boards in their proper relative positions, a support having a shifting connection with said form, means for fastening the slats to the edges of the crate-boards, a cam for causing the form to have an automatic intermittent shift or feeding movement relatively to the means which apply the fastening devices to the slats and edges of the crate-boards, and suitable ways for engaging the form and causing the latter and the said support to automatically separate, said separation being for the purpose of allowing the form to rotate, substantially as described.

7. The combination of a former, means for feeding the wire into the path of said former, means for cutting off the wire, a loop-bar arranged in position to support the wire and coöperate with said former in bending and shaping the staple, a pair of pivoted dogs arranged in position to engage and bend the points or end portions of the staple, said dogs thereby centering and alining the staple-points before the staple is driven, and a driver, substantially as described.

8. In a stapling-machine, the combination of a former, means for feeding the wire into the path of said former, means for cutting off the wire in suitable lengths, the cutting device being of such character as to provide each length of wire with one-sided points, a loop-bar arranged to coöperate with said former in bending the wire into staples, a pair of pivoted dogs arranged in position to engage and bend the staple-points into the center, said dogs thereby centering and alining the staple-points before the staples are driven, and means for driving the staples, substantially as described.

9. In a machine for cutting wire and bending it into staples, the combination of a cutting device adapted to cut the wire into suitable lengths having one-sided points, means for bending said lengths of wire into staples, and a pair of deflectors arranged in position to engage and bend the staple-points into the center, said deflectors engaging each staple at opposite sides, so as to center and aline the points of each staple, substantially as described.

10. In a machine for cutting wire into suitable lengths, and bending said lengths into staples, the combination of a cutting device adapted to cut the wire into suitable lengths having one-sided points, means for bending said lengths into staples, and a pair of movable deflectors arranged in position to engage and bend the staple-points into the center, said deflectors engaging each staple at opposite sides, so as to center and aline the points of each staple, substantially as described.

11. In a stapling-machine, the combination of means for feeding the wire, means for cutting the wire into suitable lengths having one-sided points, a former and loop-bar arranged to coöperate in bending said lengths of wire into staples, a pair of oppositely-arranged pivoted dogs engaged by the lower end of said former to bend or deflect the points of said staples, and a driver for driving the staples, substantially as described.

12. In a stapling-machine, the combination of means for feeding the wire, a cutting device for cutting the wire into suitable lengths having one-sided points, a former and loop-bar coöperating to bend said lengths of wire into staples, a pair of oppositely-arranged swinging deflectors having their swinging end portions arranged in position to be engaged by the lower end of the former, the said end portions of the deflectors being depressed by said former and brought into position to engage and bend the points of the staple, and a driver for driving the staple, substantially as described.

13. In a stapling-machine, the combination of means for feeding the wire, a cutting device adapted to cut the wire into suitable lengths having one-sided points, a bifurcated former, a loop-bar arranged to coöperate with said former in bending said lengths of wire into staples, a pair of pivoted and spring-controlled dogs or fingers arranged in position to be depressed by the downward movement of said former, such movement on the part of said dogs or fingers operating to deflect or bend the staple-points into the center, and a driver for driving the staples, substantially as described.

14. In a stapling-machine, the combination of means for feeding the wire, a cutting device adapted and arranged to cut the wire into suitable lengths having one-sided points, a bifurcated former, a loop-bar adapted and arranged to coöperate with said former in shaping and bending the said lengths of wire into staples, a pair of oppositely-arranged pivoted dogs or fingers, springs for maintaining the said dogs or fingers in an elevated position, the ends of said dogs or fingers being in position to be engaged by the downward movement of the former, such movement causing the ends of the dogs or fingers to swing downwardly in a direction to engage and bend the points or end portions of the staples, the said dogs or fingers pointing in opposite directions, substantially as described.

15. In a machine for forming and driving staples, the combination of means for feeding the wire, means for shaping and driving the staples, a form for holding the work, said form being mounted for rotation about an axis transverse to the line of feed of said wire, and an automatically-shifting support for said form, the form and its shifting support separating automatically to permit the form to turn and rotate, substantially as described.

16. In a stapling-machine, the combination of mechanism for feeding the wire, means for shaping and driving the staples, a bodily-adjustable form for holding the work, said form being mounted for rotation about an axis transverse to the line of feed of said wire, an automatically shifting or sliding support for carrying the form, the form and its shifting or sliding support separating automatically to permit the form to turn or rotate, substantially as described.

17. A stapling-machine comprising suitable means for feeding the wire, mechanism for shaping and driving the staples, a rotatable form for holding the work, said form being bodily adjustable in a direction transverse to its axis of rotation, and a shifting or sliding support for carrying said rotary form, said form and its support separating to permit the form to turn or rotate, substantially as described.

18. A stapling-machine comprising means for feeding the wire, a series of devices for shaping and driving the staples, a form for holding the work, said form being rotatable about an axis extending parallel, or substantially parallel, with said series of staple forming and driving devices, and a support engaging said form and opposing the pressure of the devices which drive the staples, said rotary form and its support separating or shifting relatively to permit the form to turn or rotate, substantially as described.

19. A stapling-machine comprising means for feeding the wire, mechanism for bending and driving the staples, a rotatable form supported and arranged for bodily rise and fall, and suitable bearings arranged to support the form for rotation about a horizontal axis, substantially as described.

20. A stapling-machine, comprising means for feeding the wire, a plurality of staple bending and driving devices arranged in a row, and a rotatable form for holding the work, said form being supported and arranged for bodily rise and fall, and the axis of said form extending parallel with said row of said staple bending and driving devices, substantially as described.

21. A stapling-machine, comprising means for feeding the wire, mechanism for bending and driving the staples, a rotatable form for holding the work, and a support which sustains the weight of the form and work during the driving of the staples, said support automatically locking the form against rotation during the driving of the staples, and said form and support automatically separating in order to allow the form to turn or rotate, substantially as described.

22. A stapling-machine, comprising means for feeding the wire, a staple bending and driving mechanism, a rotatable form mounted in suitable bearings, and a support which engages the under side of the form and sustains the weight of the form and work during the operation of driving the staples, the said support also automatically locking the form against rotation during said operation, and means for causing the form and its support to automatically separate for the purpose of allowing the form to turn or rotate, substantially as described.

23. A stapling-machine, comprising means for feeding the wire, staple bending and driving mechanism, a bodily adjustable or movable support, and a form adapted to hold the work and rotatably mounted upon said shifting support, said support engaging the work and opposing the pressure of the devices which drive the staples, substantially as described.

24. A stapling-machine comprising means for feeding the wire, staple bending and driving mechanism, a horizontally shifting or sliding support, and a form adapted to hold the work and rotatably mounted upon said sliding or shifting support, the back-and-forth movement of the support carrying the form in a forward-and-back direction relatively to the staple bending and driving mechanism, said support engaging the work and directly opposing the pressure of the devices which drive the staples, substantially as described.

25. A stapling-machine comprising means for feeding the wire, mechanism for bending and driving the staples, a rotatable form for holding the work, and a shifting support for said form, the support and form separating to permit the latter to turn, substantially as described.

26. In a stapling-machine, the combination of means for driving staples, a rotatable form, a shifting support for said form, the support and form being capable of separating or shifting relatively for the purpose of permitting the form to turn, and the said support engaging the work and thereby opposing the pressure of the devices which drive the staples, substantially as described.

27. A stapling-machine comprising means for feeding the wire, mechanism for shaping and driving the staples, a rotatable form for holding the work, a support for said form, the support and form being mounted for forward-and-back shift or adjustment, and the rotatable form and its support having a bodily intermittent shift or movement in a horizontal plane below the staple bending and driving mechanism, substantially as described.

28. A stapling-machine comprising means for feeding the wire, mechanism for bending and driving the staples, a rotatable form for holding the work, a support for supporting the form and work during the operation of driving the staples, said form being mounted for rotation about a horizontal axis, means for causing a relative shift on the part of the form and its support, so as to allow the same to separate and thereby permit the form to turn, the form having a bodily intermittent movement in a horizontal plane below said staple bending and driving mechanism, substantially as described.

29. A stapling-machine comprising means for feeding the wire, a plurality of staple bending and driving devices arranged in a row, a rotatable form for holding the work, a support upon which said form is mounted and which sustains the weight of the form and work during the operation of driving the staples, the form being mounted for rotation upon an axis parallel with said row of staple bending and driving devices, the form and its support being mounted for bodily forward-and-back motion or adjustment in a direction transverse to said row of staple bending and driving devices, the form and its support separating for the purpose of allowing the form to turn, and the form and its support having an intermittent shift or feeding movement while advancing below said staple bending and driving devices, substantially as described.

30. A stapling-machine comprising means for feeding the wire, a plurality of staple bending and driving devices arranged in a row, a form adapted to hold the work and mounted for rotation about an axis parallel with said row of staple bending and driving devices, a support automatically engaging the under side of the form and sustaining the weight of the form and work during the operation of driving the staples, the form and its support automatically separating in order to allow the form to turn or rotate, and means for causing the bodily forward-and-back movement on the part of said form and its support, and a cam for causing a bodily intermittent shift or feeding movement on the part of said form while advancing below said staple bending and driving devices, substantially as described.

31. In a stapling-machine, the combination of mechanism for shaping and driving the staples, a form for holding the work, a support for said form, the support and form and mechanism for shaping and driving the staples being capable of relative separation, so as to permit the form to turn the work, substantially as described.

32. A stapling-machine comprising means for feeding the wire, means for bending and driving the staples, a rotatable form for holding the work, a support for said form and a cam for causing the support and form to separate, so as to allow the form to turn or rotate, substantially as described.

33. A stapling-machine comprising means for feeding the wire, mechanism for bending and driving the staples, a rotatable form adapted to hold the work, and a cam for causing the form to move back and forth below the said staple bending and driving mechanism, said cam causing an intermittent shift or feeding movement on the part of the form while advancing below said mechanism, and a cam releasing the form and allowing it to have free or independent back movement, substantially as described.

34. A stapling-machine comprising means for feeding the wire, a plurality of staple bending and driving devices, arranged in a row, a form adapted to hold the work and mounted for rotation about a horizontal axis extending parallel with said row of staple bending and driving devices, a support which automatically engages the under side of the form and thereby sustains the weight of the form and work during the operation of driving the staples, the form and its support being mounted for bodily forward-and-back movement in suitable guideways, such forward-and-back movement being in a direction transverse to said row of staple bending and driving devices, a power-shaft, a cam for communicating forward-and-back motion from said power-shaft to said form, said cam being shaped to cause an intermittent shift or feeding movement on the part of said form while advancing below said staple bending and driving devices, and means for controlling the rotation of said cam, substantially as described.

35. A stapling-machine, comprising means for feeding the wire, a plurality of staple bending and driving devices arranged in a row, or substantially in a row, a form adapted to hold the work and mounted for rotation about a horizontal axis extending parallel, or substantially parallel, with said row of stapling devices, a support automatically engaging said form and thereby sustaining the weight of the form and work during the operation of driving the staples, a power-shaft, a cam for communicating motion to said form and support, the movement of said form and support being in a direction transverse to the axis of said form and to the said row of stapling devices, means for controlling the rotation of said cam, the cam being shaped to cause an intermittent shift or feeding movement on the part of the form while advancing below the said stapling devices, and the said cam being adapted to permit a quick release or back movement on the part of the form and its support, substantially as described.

36. A stapling-machine comprising means for feeding the wire, mechanism for bending and shaping the staples, a form adapted to hold the work, a power-shaft, a cam and lever for communicating motion from said shaft to said form, the cam being adapted to cause an intermittent shift or feeding movement on the part of said form while advancing below said staple bending and driving mechanism, and means for controlling the rotation of said cam, substantially as described.

37. A stapling-machine comprising means for feeding the wire, a plurality of staple bending and driving devices arranged in a row, a suitable framework or body constructed with guideways, a support arranged for forward-and-back or sliding movement in said guideways, a rotatable form mounted on said support and adapted to hold the work, said guideways being in position to cause the form and its support to move back and forth below said stapling devices, the support automatically engaging the under side of the form to sustain the weight of the form and work during the operation of driving the staples, the form and its support automatically separating after the driving of the staples in order to allow the form to turn or rotate, the forward-and-back movement of the form being in a direction transverse to its axis and to the said row of stapling devices, a power-shaft, a power-transmitting connection between said shaft and said support adapted to cause the latter and the form to move back and forth below said stapling devices, the form having an intermittent shift or feeding movement while advancing below the staple bending and driving devices, and said power-transmitting connection permitting the form and its support to have a free and independent back-and-forth movement or return to its inoperative position, and a clutch and foot-treadle for controlling the transmission of power and movement from said shaft to said support, substantially as described.

38. A stapling-machine comprising means for feeding the wire, a plurality of staple bending and driving devices arranged in a row, a rotatable form adapted to hold the work, means for shifting the form, so as to cause it to move back and forth below said staple bending and driving devices, a shiftable support upon which said form is mounted, the form and its support automatically engaging each other during the operation of driving the staples, so as to prevent the form from turning, and the form and its support automatically separating upon the return of the form to its inoperative position, so as to allow the form to turn or rotate, a power-shaft, and means for communicating power and motion from said shaft to said support, substantially as described.

39. A stapling-machine comprising means for feeding the wire, mechanism for bending and driving the staples, a form adapted to hold the work and mounted for rotation, said form being also mounted for bodily forwardand-back movement below said stapling devices, a cam for causing a bodily forward shift on the part of said form, said cam releasing the form and permitting it to have a free or independent back movement to its original or inoperative position, and means for retarding the back movement or return of said form, substantially as described.

40. A stapling-machine comprising means for feeding the wire, a plurality of staple bending and driving devices arranged in a row, a form arranged for bodily forward-and-back movement below and in a direction transverse to said row of stapling devices, said form being rotatable about an axis parallel, or substantially parallel, with said row of staple bending and driving devices, and mechanism for automatically rotating or turning the form about its axis during its return movement, substantially as described.

41. A stapling-machine comprising mechanism for forming and driving the staples, a form for holding the work, said form being supported for rotation about a horizontal axis, means for causing said form to shift and move in a direction at right angles to this axis, and devices for gripping and removing the finished work or product from the said form, substantially as described.

42. In a stapling-machine comprising mechanism for bending and driving the staples, a bodily-shifting form for holding the work, means for causing the form to have a bodily back-and-forth or reciprocating movement, and devices for gripping and removing the finished work or product from the said form, said devices engaging the work or finished product when the form moves forward for the last time, substantially as described.

43. A stapling-machine comprising means for feeding the wire, mechanism for bending and driving the staples, a rotatable bodily-shifting form for holding the work, a driven member and power-transmitting connections for causing the said form to have a bodily back-and-forth or reciprocating movement, and devices for engaging and removing the finished work or product from the said form, said devices engaging the finished work or product when the form moves forward for the last time, substantially as described.

44. In a stapling-machine comprising means for feeding the wire, a plurality of staple bending and driving devices arranged in a row, a form adapted to hold the work and arranged for bodily shift in a direction transverse, or substantially transverse, to said row of staple bending and driving devices, and a pair of grappling-hooks or arms arranged to automatically engage and remove the finished work or product from the said form, substantially as described.

45. A stapling-machine comprising a suitable frame or body, means for feeding the wire, a plurality of staple bending and driving devices arranged in a row, a rotary form adapted to hold the work and arranged for forward-and-back movement below said staple bending and driving devices, a pair of oppositely-arranged arms or grappling-hooks arranged to engage and automatically remove the finished work or product from the said form, and means for causing a forward-and-back movement of said form, substantially as described.

46. A stapling-machine comprising a suitable frame or body, means for feeding the wire, a plurality of staple bending and driving devices arranged in a row, a rotatable form adapted to hold the work and arranged for bodily forward-and-back movement below said staple bending and driving devices, each end of said form being provided with a slot, a pair of swinging arms or grappling-hooks mounted upon said frame or body and arranged in position to engage and automatically remove the finished work or product from the said form, the end portions of said arms or hooks being adapted to enter said slot in the end of said form, substantially as set forth.

47. A stapling-machine comprising means for feeding the wire, means for bending and driving the staples, a form for holding the work, mechanism for causing a bodily forward-and-back movement on the part of said form, a holder for supporting certain portions of the stock or material in position to be engaged and removed therefrom by the form during its forward movement, dogs or fingers moving with said form and adapted to engage and remove the stock from said holder, the stock or material supported by said holder automatically feeding downward to permit each forward movement of the form to remove the desired amount or quantity of said material and carry it forward into position to be operated upon by said staple bending and driving mechanism, substantially as described.

48. A stapling-machine comprising a suitable frame or body, a horizontal bar mounted for up-and-down movement, a plurality of staple formers and drivers carried by said bar, a rotatable form for holding the work, said form being arranged for bodily forward-and-back movement below and in a direction transverse to said bar, means for feeding the wire, means for causing an up-and-down movement on the part of said bar, said form being rotatable about an axis substantially parallel with said bar, substantially as described.

49. A stapling-machine comprising a suitable frame or body, a horizontal bar mounted for up-and-down movement in suitable guideways formed in said frame or body, a plurality of staple formers and drivers arranged in a row or line and carried by said bar, a rotary form arranged for bodily forward-and-back movement in a plane below and in a direction substantially parallel with said vertically-movable bar, a bodily-shifting support for said form, said form being rotatable about an axis extending parallel with said bar, and the direction in which the form shifts or moves bodily being at right angles to the axis about which it rotates, and a cam for causing a bodily forward-and-back movement on the part of said form below said row of staple formers and drivers, substantially as described.

50. A stapling-machine comprising means for feeding the wire, mechanism for bending and driving the staples, a rotary form for holding the work, said form being arranged for bodily forward-and-back movement below said staple bending and driving mechanism, the direction in which the form moves or shifts being at right angles to its axis, a cam for causing the form to move forward below said staple bending and driving mechanism, said cam releasing the said form at the end of the latter's forward movement, and a weight for drawing the form back to its original or inoperative position, substantially as described.

51. A machine for making crates comprising means for feeding the wire, a plurality of staple bending and driving devices, a form for holding the work, said form being adapted to receive the end and intermediate walls of said crate and hold the same in position to receive the slats or side portions of said crate, a support which automatically engages the under side of said form and thereby sustains the weight of the form and work during the operation of driving the staples, means for causing the form and its support to shift back and forth below the said staple bending and driving devices, and means for causing the form and its support to separate in order to allow the form to turn or rotate, substantially as described.

52. A machine for making crates, comprising means for feeding the wire, a plurality of staple bending and driving devices arranged in a row, a form for holding the work and mounted for forward-and-back movement in a direction transverse to said row of staple bending and driving devices, the number of said staple bending and driving devices corresponding to the number of end and intermediate walls or boards of said crate, and the said form being provided with means for holding each of said walls or boards in line with its allotted staple bending and driving devices, said form being rotatable upon an axis extending parallel, or substantially parallel, with said row of staple bending and driving devices, and means for moving the said form back and forth below said staple bending and driving devices, the form having an intermittent shifting movement while advancing below said staple bending and driving devices, substantially as described.

53. A machine for stapling crates, comprising means for feeding the wire, a plurality of staple bending and driving devices arranged in a row, a rotatable form, a support for said form, the form being rotatable upon an axis parallel, or substantially parallel, with said row of said staple bending and driving devices, the support for said form being shiftable in a direction transverse to the axis of said form, the number of said staple bending and driving devices corresponding to the number of transverse boards or walls of said crate, the said form being provided with means for holding each of said transverse walls or boards in line with its allotted staple bending and driving device, the said support sustaining the weight of the form and work during the operation of driving the staples, thereby preventing rotation of the form during such operation, and the said form and its support automatically separating to allow the form to turn or rotate, means for causing a forward-and-back movement on the part of said form, the latter having an intermittent movement while advancing below the said staple bending and driving devices, substantially as described.

54. A machine for making crates comprising means for feeding the wire, a plurality of staple bending and driving devices arranged in a row, the number of said staple bending and driving devices corresponding to the number of transverse walls or boards of said crate, a form for holding the work and adapted to hold each transverse wall or board of the crate in line with its allotted staple bending and driving device, the form being arranged for forward-and-back movement in a direction transverse to its axis, so as to carry the said crate-boards into position to receive the staples from the said staple bending and driving devices, means for rotating the form, so as to successively present the different edges of the said crate-boards to said stapling devices, and a cam suitably arranged and connected for causing the said forward-and-back movement of the form, the cam being so shaped as to cause the form to have an intermittent shift or feeding movement while advancing below said staple bending and driving devices, thereby giving the staple bending and driving devices time to operate properly, and means for controlling the rotation of said cam, substantially as described.

55. A stapling-machine comprising means for feeding the wire, means for shaping and driving the staples, a form for holding the crate-boards, and a cam for causing a bodily intermittent movement of said form in a direction parallel, or substantially parallel, with the line or direction of feed of said wire, the said staple shaping and driving means being adapted to receive the wire thus fed, and the said staple shaping and driving means inserting the staples lengthwise in the edges of the crate-boards, substantially as described.

56. A stapling-machine comprising means for feeding the wire, means for shaping and driving the staples, a form for holding the crate-boards, said form being bodily adjustable and also rotatable upon an axis extending at right angles, or substantially at right angles, with the line of feed of said wire, whereby the said staple shaping and driving means are enabled to insert the staples lengthwise in the edges of the crate-boards, and a ratchet device for causing intermittent rotation of said form, substantially as described.

PHILLIP FRED LINDT.

Witnesses:
JULIUS J. MILLER,
GUSTAV H. KNAAK.